US012673421B2

(12) United States Patent
Longo et al.

(10) Patent No.: US 12,673,421 B2
(45) Date of Patent: Jul. 7, 2026

(54) PROCESSING APPARATUS AND RELATIVE MARKING DEVICE TO GENERATE PROCESS TRAJECTORIES

(71) Applicant: Comau S.p.A., Grugliasco (IT)

(72) Inventors: Nicola Longo, Grugliasco (IT);
Francesco Ciniello, Grugliasco (IT);
Gerardo Renga, Grugliasco (IT);
Giovanni Di Stefano, Grugliasco (IT);
Gian Paolo Gerio, Grugliasco (IT)

(73) Assignee: Comau S.p.A., Grugliasco (IT)

( * ) Notice: Subject to any disclaimer, the term of this patent is extended or adjusted under 35 U.S.C. 154(b) by 172 days.

(21) Appl. No.: 18/574,382

(22) PCT Filed: Jun. 27, 2022

(86) PCT No.: PCT/IB2022/055935
§ 371 (c)(1),
(2) Date: Dec. 27, 2023

(87) PCT Pub. No.: WO2023/275701
PCT Pub. Date: Jan. 5, 2023

(65) Prior Publication Data
US 2024/0293933 A1 Sep. 5, 2024

(30) Foreign Application Priority Data

Jun. 29, 2021 (IT) ........................ 102021000017033

(51) Int. Cl.
B25J 9/16 (2006.01)
B25J 11/00 (2006.01)
B25J 15/00 (2006.01)

(52) U.S. Cl.
CPC ........... B25J 9/1664 (2013.01); B25J 9/1697 (2013.01); B25J 11/005 (2013.01); B25J 15/0019 (2013.01); G05B 2219/36452 (2013.01)

(58) Field of Classification Search
CPC ...... B25J 9/1664; B25J 9/1697; B25J 9/1656; B25J 11/005; B25J 15/0019; B25J 15/0066; B23K 9/291; B23K 2101/007; G05B 2219/36452; G05B 2219/39022; G05B 2219/36481; G05B 2219/37043; G05B 2219/37217; G05B 2219/32368;
(Continued)

(56) References Cited

U.S. PATENT DOCUMENTS 5,748,854 A * 5/1998 Watanabe ............ G05B 19/423
901/3
7,236,854 B2 * 6/2007 Pretlove ................. G05B 19/42
318/568.22
(Continued)

FOREIGN PATENT DOCUMENTS

EP 2757430 A2 7/2014
ES 2 668 930 A1 5/2018
(Continued)

*Primary Examiner* — Ramon A. Mercado
*Assistant Examiner* — Noah W Stiebritz

(57) ABSTRACT

A processing apparatus includes an industrial robotic unit and a marking device provided for generating process trajectories automatically recognizable by the robotic unit. The marking device is shaped like a rod and includes at least one pointer element optically detectable by the robot by a vision system.

20 Claims, 5 Drawing Sheets

(58) Field of Classification Search
      CPC .. G06K 19/06037; G05D 1/2446; G05D 1/24;
                  G06T 2207/30204; G06T 2207/30208
      See application file for complete search history.

(56)                     References Cited

U.S. PATENT DOCUMENTS

| | | | |
|---|---|---|---|
| 8,412,379 B2 | 4/2013 | Gerio et al. | |
| 10,780,580 B2 * | 9/2020 | Fukunaga | B25J 13/06 |
| 11,054,804 B2 | 7/2021 | Bordegnoni et al. | |
| 11,648,667 B2 * | 5/2023 | Chi | B25J 9/1671 |
| | | | 700/253 |
| 2017/0202537 A1 | 7/2017 | Ippolito et al. | |
| 2018/0354130 A1 | 12/2018 | Preisinger et al. | |
| 2023/0278211 A1 * | 9/2023 | Koyama | B25J 9/0081 |
| | | | 700/264 |
| 2024/0156553 A1 * | 5/2024 | Aouachria | A61B 34/77 |

FOREIGN PATENT DOCUMENTS

| | | | |
|---|---|---|---|
| JP | S60 136806 A | 7/1985 | |
| JP | 2011104759 A | 6/2011 | |
| JP | 2019046666 A * | 3/2019 | |
| KR | 101265552 B1 | 5/2013 | |
| KR | 101661665 B1 * | 10/2016 | B23Q 17/249 |
| WO | 98/00766 A1 | 1/1998 | |

* cited by examiner

PROCESSING APPARATUS AND RELATIVE MARKING DEVICE TO GENERATE PROCESS TRAJECTORIES

CROSS-REFERENCE TO RELATED APPLICATION(S)

This application is filed pursuant to 35 U.S.C. § 371 claiming priority benefit to PCT/IB2022/055935 filed Jun. 27, 2022, which claims priority benefit to Italian Patent Application No. 102021000017033 filed Jun. 29, 2021, the contents of both applications are incorporated herein by reference in the entirety for all purposes.

TECHNICAL FIELD

The present invention relates to a processing apparatus comprising an industrial robotic unit and a marking device provided for generating process points and/or trajectories automatically recognizable by the robotic unit.

BACKGROUND

An apparatus of the type indicated above is, for example, described in the document KR 101265552 B1. This document illustrates a pointer device configured to indicate the points wherein to perform a welding operation to an industrial robot. The pointer device is detectable by the robot by means of an electro-mechanical device, which includes a cable that unwinds from a coil carried in an orientable way by the robot. The free end of the cable is hooked to the tip of the rod-shaped pointer device. When the tip of the pointer device is positioned at a given point, the position of the point is calculated based on the unwinding length of the cable and the orientation angle of the coil, measured by respective encoders.

A solution of this type means that there can be no obstacles between the coil carried by the robot and the point to be detected, since the cable must be able to extend according to a straight path.

It would, therefore, be desirable to provide an apparatus of the type indicated above that allows improvement of the flexibility and efficiency of the execution of the processing operations, so as to be able to carry out processing cycles in a simple and fast way.

SUMMARY

The object of the present invention is, therefore, that of overcoming the aforesaid drawbacks, producing an apparatus of the type indicated above, which has characteristics of high flexibility and efficiency.

A further object of the invention is to provide an apparatus of the type indicated above which is extremely intuitive for the operators, providing a system for detecting and controlling operations that is particularly simple to use.

In order to achieve these objects, the invention relates to a processing apparatus comprising an industrial robotic unit and a marking device provided for generating process trajectories that are automatically recognizable by the industrial robotic unit, wherein:

said industrial robotic unit is a multi-axis manipulator robot including processing means arranged to perform a plurality of processing or assembly operations, said marking device is configured to be used manually by an operator to indicate process trajectories automatically recognizable by the robot, wherein the marking device is rod-shaped and comprises at least one pointer element optically detectable by the industrial robotic unit by means of a vision system.

The invention also relates to the method implemented by means of the apparatus described above.

As used herein, the expression "processing apparatus" refers to any type of industrial apparatus designed to perform continuous or discontinuous processings, such as welding, sealing, riveting, nailing, apparatus etc.

Further characteristics and advantages of the invention are indicated in the attached dependent claims.

BRIEF DESCRIPTION OF THE DRAWINGS

Further characteristics and advantages of the invention will become apparent from the description that follows with reference to the attached drawings, provided purely by way of non-limiting example, wherein.

DETAILED DESCRIPTION

In the following description various specific details are illustrated aimed at a thorough understanding of examples of one or more embodiments. The embodiments can be implemented without one or more of the specific details, or with other methods, components, materials, etc. In other cases, known structures, materials, or operations are not shown or described in detail to avoid obscuring various aspects of the embodiments. The reference to "an embodiment" in the context of this description indicates that a particular configuration, structure or characteristic described in relation to the embodiment is included in at least one embodiment. Therefore, phrases such as "in an embodiment", possibly present in different places of this description do not necessarily refer to the same embodiment. Moreover, particular conformations, structures or characteristics can be combined in a suitable manner in one or more embodiments and/or associated with the embodiments in a different way from that illustrated here, for example, a characteristic here exemplified in relation to a figure may be applied to one or more embodiments exemplified in a different figure.

The references illustrated here are only for convenience and do not, therefore, delimit the field of protection or the scope of the embodiments.

Figure 1:
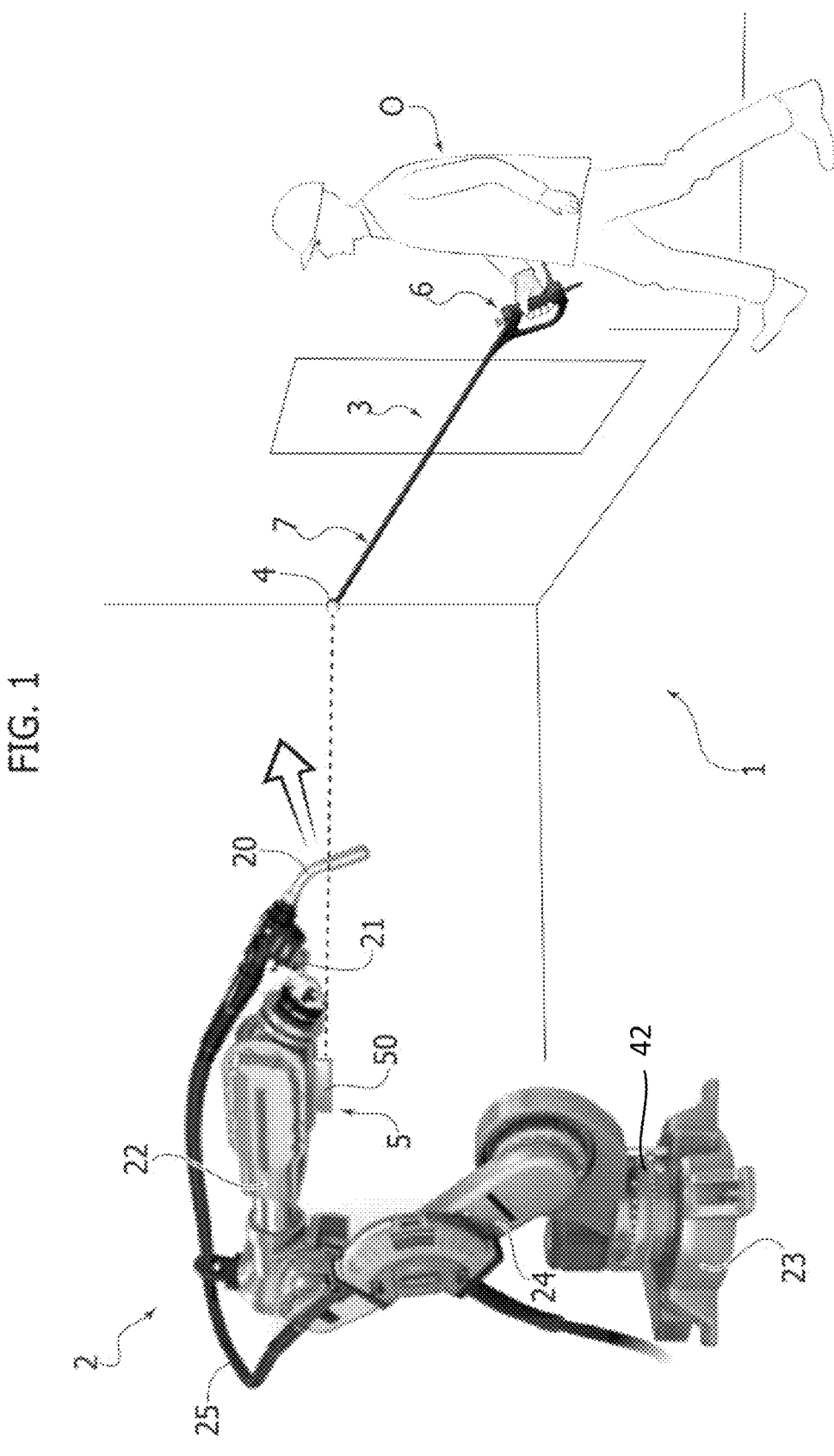
FIG. 1 is a schematic perspective view that illustrates a preferred embodiment of the apparatus according to the invention.
Figure 2:
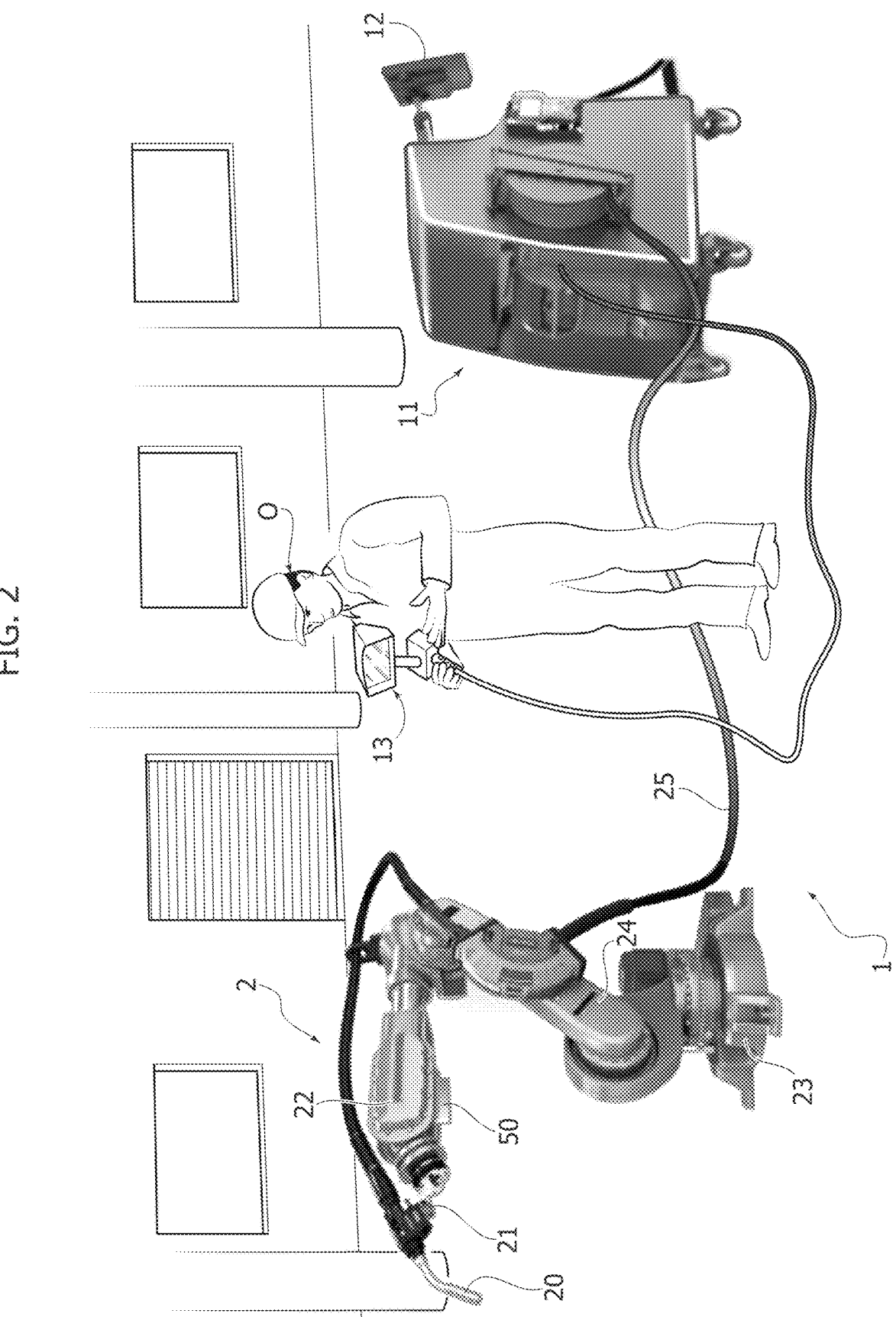
FIGS. 2, 3 are schematic perspective views that illustrate additional components of the apparatus according to the invention.

With reference to FIGS. 1, 2, reference 1 indicates—in its entirety-a processing apparatus comprising an industrial robotic unit 2 that can be associated with a marking device 3, configured to generate process points and trajectories that are automatically recognizable by the robotic unit 2.

As already indicated, the expression "processing apparatus" refers to any type of industrial apparatus designed to perform continuous or discontinuous processings, such as welding, sealing, riveting, nailing, apparatus etc.

FIGS. 1, 2 illustrate an embodiment, relating to a robotic welding unit. This example is not to be considered in any way limiting, because, as indicated above, the invention is applicable to any industrial apparatus designed to perform continuous or discontinuous processing operations.

With reference to the embodiment illustrated in FIGS. 1, 2, the robotic unit 2 includes processing means 20 configured to perform a plurality of processing or assembly operations.

According to the invention, the robotic unit 2 is a multi-axis manipulator robot having a base 23 and a column 42 rotatably mounted on the base 23 around a first vertically directed axis. The robot 2 has an arm 24 mounted on the column 42 articulated about a second axis II directed horizontally; reference 22 indicates a forearm mounted on the aforesaid arm 24. The forearm 22 is articulated about a third axis, which is also directed horizontally; the forearm 22 also has the possibility of rotating about its longitudinal axis. The forearm 22 of the robot 2 is provided at its end with a wrist, mounted with the possibility to rotate about two mutually orthogonal axes. According to the prior art, each of the six axes of the robot 2 is controlled by a respective electric motor. The electric motors of the robot 2 are controlled by an electronic control unit in a per se known manner (not illustrated in the drawings). At the distal end of the wrist of the robot 2 there is a flange 21 for attaching the processing means 20 carried by the robot 2.

In the embodiment illustrated in FIGS. 1, 2, welding means are mounted on the flange 21 of the robot 2. Preferably, the welding means comprise a welding torch arranged for carrying out an arc welding with metal under gas protection (MIG/MAG). Of course, the invention also relates to the case wherein welding means configured to perform other types of welding (for example, laser welding, resistance welding, etc.) are provided.

Note that instead of a stationary robot, the robotic unit 2 may comprise a robot mounted on a vehicle or on any other robot-positioning system, including another robot.

In accordance with what is illustrated in FIG. 2, the processing means 20 are connected—by means of an electrical connection cable 25—to a service trolley 11 comprising a controller configured to control the movements of the robot 2 and the processing means 20. In accordance with the embodiment illustrated in FIG. 2, a reel on which to wind the aforesaid connection cable 25 and a support body to support the cable 25 are mounted on-board the robotic unit 2.

As previously indicated, the apparatus 1 comprises a marking device 3 arranged to generate points and process trajectories that are automatically recognizable by the robotic unit 2. The marking device 3 can be used manually by an operator O, so as to define the working points each time.

According to the invention the marking device 3 is shaped like a rod and comprises at least one pointer element 4, configured to be optically detectable by the robotic unit 2 by means of a vision system 5. In one or more embodiments, the vision system 5 is mounted on-board the robot 2.

Figure 3:
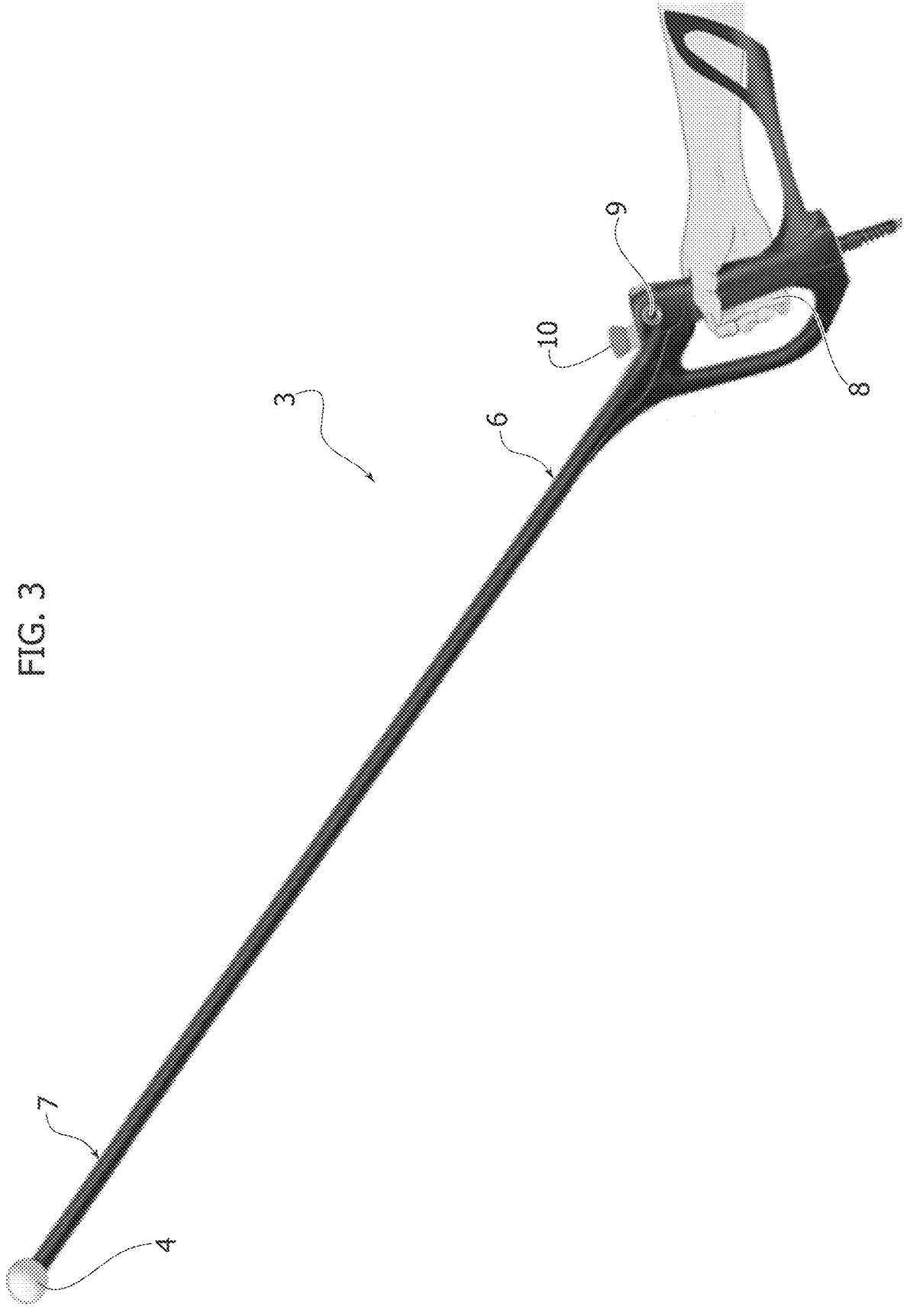

In accordance with the embodiment illustrated in FIGS. 1, 3, the marking device 3 comprises a proximal portion 6 designed to be gripped by the operator O, and an end portion 7 including the pointer element 4 that is automatically recognizable by the robot 2. Preferably, the pointer element 4 is arranged at the tip of the marking device 3, so as to render particularly intuitive the step of indicating working points, carried out manually by the operator O.

In one or more embodiments, as well as in the one illustrated in FIG. 3, the marking device 3 is a three-dimensional solid-shaped body with a telescopic rod, comprising a plurality of tubular members configured to slide one inside the other. Thanks to this characteristic, the operator O can vary the extension of the marking device 3 according to the characteristics of the working area in which it is operated and the distance from the point to be indicated by means of the pointer element 4.

As previously indicated, the manipulator robot 2 is equipped with a vision system 5 arranged to detect the position of the pointer element 4. This vision system 5 may be produced by composing optical and electronic components, for example, one or more video cameras, which allow acquisition, recording and processing of a sequence of detected images. The result of the processing is the recognition of certain characteristics of the image, to finalize the control and selection of the position of the pointer element 4.

In one or more embodiments, a video camera 50 is rigidly connected to the forearm 22 of the robot 2, so as to be freely orientable in space, integrally with the movements of the forearm 22.

In one or more embodiments, the pointer element 4 comprises a polygonal-shaped body comprising a plurality of faces, wherein on each face there is a QR code readable by the video camera 50 carried by the robotic unit 2.

In one or more embodiments, the pointer element 4 is a three-dimensional element of a predetermined geometry known by the vision system 5, following a preliminary programming step of the apparatus 1. In this case, the vision system 5 is able to detect and identify the position of the three-dimensional pointer element 4, so as to uniquely estimate the orientation and position of the robot 2 in space.

The apparatus 1 is also configured to perform a preliminary self-calibration (e.g., auto-calibration) step, to accurately identify the position and the distance of the pointer element 4 with respect to the aforesaid video camera 50, and therefore to the base portion 23 of the robot 2.

It should be noted that thanks to the characteristics indicated above, by means of the pointer element 4 automatically recognizable by the robot 2, it is possible to make the robot 2 learn the working points in which to intervene with the processing means 20, in a particularly fast and intuitive way.

In the case of continuous processings, it is possible to indicate with the pointer element 4 a starting point, an end point and a path that extends between the starting point and the end point. As previously indicated, preferably the pointer element 4 is arranged on the tip of the rod-shaped marking device 3.

In the event that there is an obstacle along a process trajectory that is to be indicated by the marking device 3, the apparatus 1 envisages the possibility of accurately detecting-between the starting point and the end point of the process trajectory-a point identifying the position of the aforesaid obstacle. The apparatus 1 provides the functionality of automatically executing the processing from the starting point to the end point, bypassing the obstacle identified previously.

Again with reference to FIG. 3, the proximal portion 6 of the marking device 3 comprises an activation button 8 configured to enable the movement of the robot 2. Preferably, this activation button 8 comprises a "dead man" safety function, such that following a pressure on the button 8 beyond a certain force, or if the button 8 is completely released, the robot 2 stops completely. According to a further characteristic illustrated in FIG. 3, the proximal portion 6 of the pointer element 4 also comprises a selection button 9 configured to exchange activity activation or interruption messages with the vision system 5, such as, for example, activating the search function of the pointer element 4 and identifying a certain position indicated as an obstacle to be circumvented. Preferably, the marking device 3 also comprises an emergency button 10 arranged to activate an acoustic and/or visual alarm signal.

Note that the invention is also applicable in the case of a robotic unit carrying a plurality of processing tools. In this case, the operator O can select the most suitable tool to perform a specific processing (for example, using a button for selecting the specific tool, arranged on the handle of the marking device 3).

As previously indicated, the apparatus 1 also comprises a service trolley 11 operatively connected to the manipulator robot 2, including a controller of the robotic unit 2 and of the processing means 20 (FIG. 2). The service trolley 11 may also include a human-machine interface (HMI) device 12 configured to allow an operator O to easily program a work cycle. For example, the operator O may instruct (e.g., enter in) the apparatus 1 about the type of processing and may command the vision system 5 to perform a laser scan to identify the characteristics of the components on which to perform the processing (for example, the thickness of the metal sheets). The programming activity may comprise a preliminary step to the execution of the processing, wherein various operating parameters are defined to carry out the process, including the angle of approach of the robot, the orientation of the robot during the trajectory, the speed of the robot, etc. The programming activity may also include the definition step of the so-called "Tool Center Point" (TCP), which identifies the position of the active part of the tool mounted on the wrist of the robot 2, or rather, the part of the tool that performs the operation; in this regard, for example, in the case of an arc welding operation, the TCP is located on the tip of the welding torch at the end of the welding wire.

Still with reference to a preferred embodiment, the apparatus 1 may comprise a portable control and/or programming terminal 13 usable by an operator O, arranged to supply the controller with a respective control signal to improve the information to be sent to the robotic unit 2 to perform the processing operation, following the detection of a process trajectory traced by the marking device 3. The portable terminal 13 may comprise a visualizer or display and a series of buttons that can be used for programming and manual control of the movement of the robot 2. The portable terminal 13 is connected to the controller arranged on-board the service trolley 11 by means of a long wire, which allows the operator O to move close to the working area concerned, in order to be able to accurately verify the operations performed by the robotic unit 2.

In one or more embodiments, the apparatus 1 comprises a lifting unit operating in a vertical direction, configured to lift the robotic unit 2 and to allow any areas of the working area to be reached, spaced beyond a certain distance from the ground on which the robot is located. The lifting unit may comprise a bellows acting as an external cover for the lifting unit and an electric motor that powers it.

The operation of the apparatus 1 described above is indicated in the following description.

The apparatus 1 is configured to operate through an on-line programming mode, defining the single points (in the case of a discontinuous process) and the process trajectories (in the case of a continuous process), each time a specific processing must be performed on one or more components of a working area.

In the case of a continuous process, in a first operation step, the operator O uses the marking device 3, to indicate an initial point of a process trajectory with the pointer element 4. The operator O executes a command to communicate to the vision system 5 to detect the position of the pointer element 4. Following this command, the vision system 5 detects the position of the pointer element 4, and the robot 2 moves automatically, carrying the end effector towards the point indicated by the pointer element 4. After the end effector of the robot 2 is positioned close to the point previously indicated, the operator O activates another communication signal to communicate to the vision system 5 to detect the process trajectory indicated with the marking device 3, by means of moving the pointer element 4 to an end point. In this way, the robot 2 is able to identify the request by the operator O to carry out a processing (for example, a welding) from a starting point to an end point. Successively, the operator O may instruct the apparatus 1 about the type of processing, and may command the vision system 5 to perform a laser scan to identify the characteristics of the components on which to operate (for example, the thickness) by means of the processing means carried by the robot 2. When the programming of the work cycle is finished, following a command signal, the robot 2 executes the processing operation according to the trajectory and to the additional information previously learned. As previously indicated, an analogous method of acquisition by points may be defined to identify one or more obstacles to be circumvented.

During execution of the processing operation, compliance with the process trajectory previously traced and learned by the robot 2 may be achieved with an automated trajectory tracking system, chosen according to the processing operation. For example, this automated trajectory tracking system may comprise a 3D laser scanner, which allows detection and tracking of the deformation of the sheet metal during welding. More specifically, the robot is "forced" to hook onto the joint, at the correct and necessary distance for the welding process, also correcting the tilt angle of the robot's wrist, in order to keep the angle of attack to the set welding plane constant. By means of the aforesaid laser scanner it is also possible to perform a quality control of the weld performed, analyzing the weld joint, once the welding has been completed.

Thanks to the characteristics described above, the apparatus 1 according to the invention allows execution of multiple continuous or discontinuous process operations in a simple and fast way, resulting extremely intuitive for the operators.

Figures 4, 5, 6:
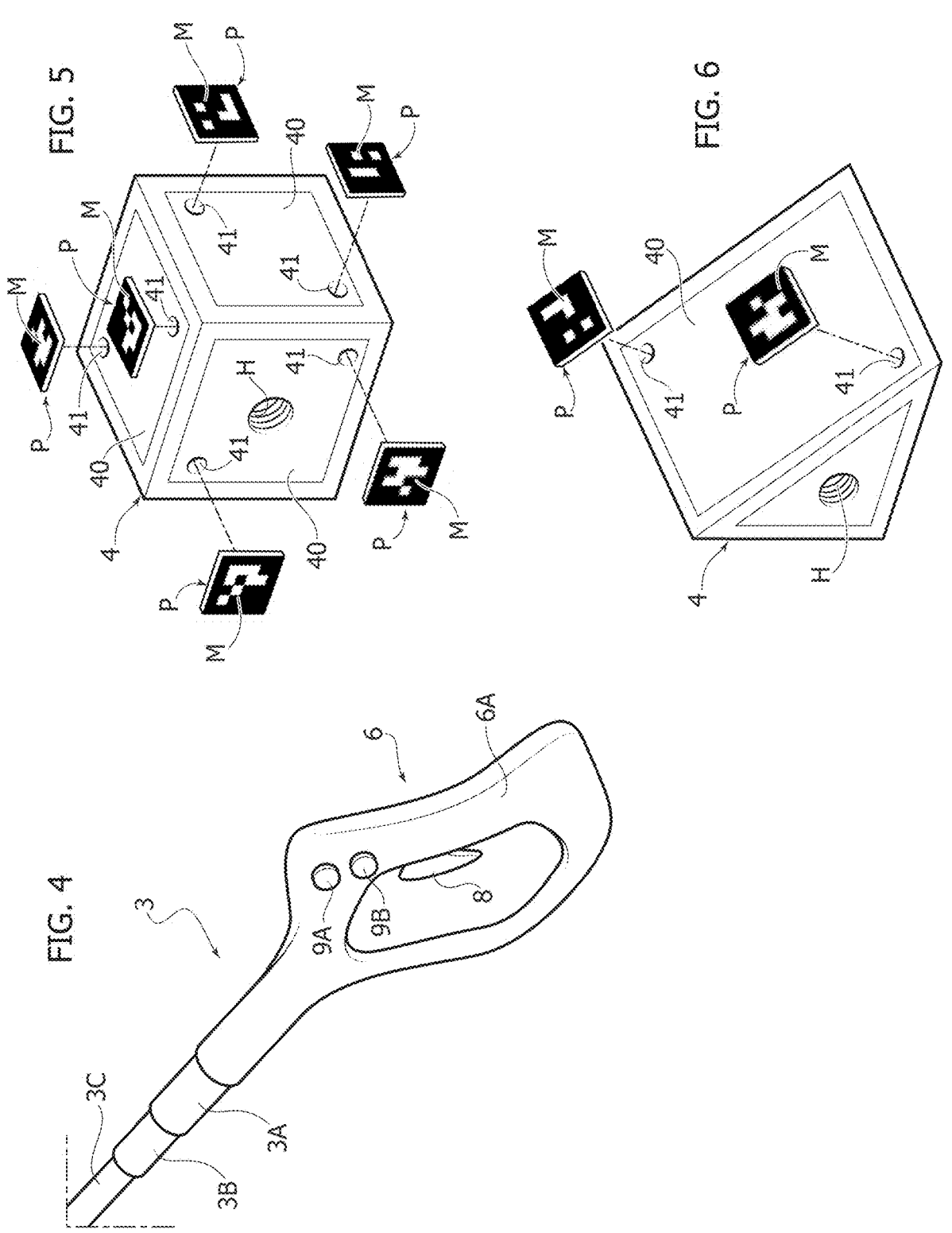
FIG. 4 illustrates another embodiment of the marking device, which is part of the apparatus according to the invention.
FIGS. 5, 6 show alternate examples of the pointer element carried by the marking device.

FIG. 4 shows another example of a marking device 3, comprising a telescopic rod consisting of mutually sliding portions 3A, 3B, 3C and including a proximal portion 6 with a handle 6A carrying a "dead man" button 8 on its internal side. Also, in this example the system is configured according to a philosophy of use conforming to that previously described, in the sense that the button 8 must be kept constantly pressed to enable operation of the apparatus, while if for any reason the button 8 is released or pressed beyond a certain force, the robot 2 stops. On the external side of the handle 6A there are two buttons 9A, 9B to command the acquisition of a point with which the pointer element 4 is in contact and the cancellation of a previously acquired point, respectively.

Figures 7, 8:
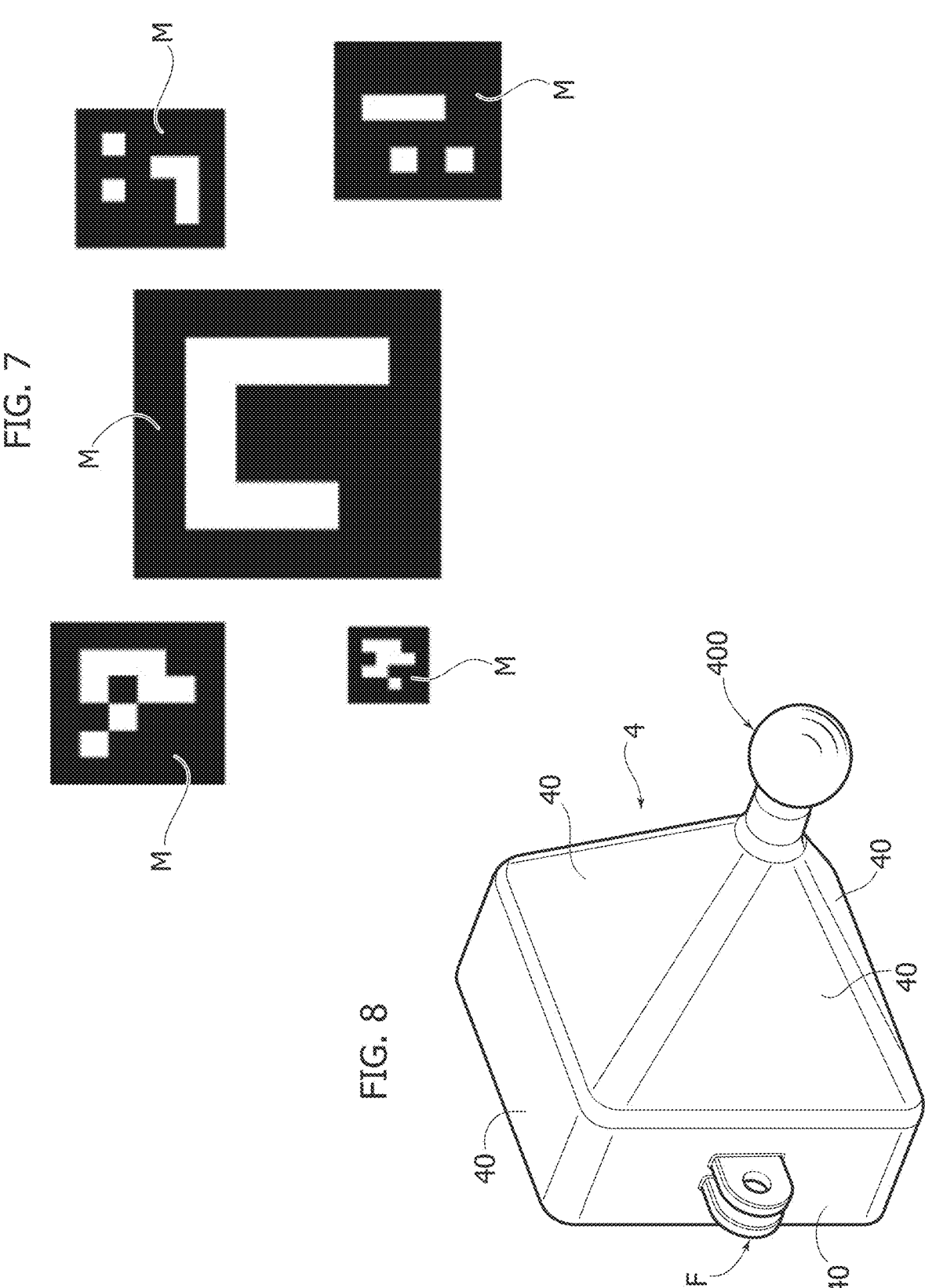
FIG. 7 shows some examples of 2D markers carried by the pointer element.
FIG. 8 shows another variant of the pointer element.

With reference to FIGS. 5, 6 and 8, the pointer element 4 may comprise a body in the form of a three-dimensional solid comprising a plurality of faces 40, and also including a contact portion 400 (illustrated in FIG. 8), configured to be brought into contact with a point of a working area, to make the robot 2 learn the position of said point.

At least some faces of the body 4 each carry one or more two-dimensional markers M, or one or more QR codes, each of which is readable by the vision system 5. In the FIG. 5 embodiment, two markers M are positioned apart from one another on three faces of the pointer element 4. FIG. 7 shows some examples of the markers M. Each M marker can—in turn—comprise several markers.

FIG. 5 shows the example of a cubic body, having a threaded hole H for engaging a threaded end of the rod of the device 3. FIG. 6 shows the example of a wedge-shaped body, with a threaded hole H for engaging the end of the rod. FIG. 8 shows a pyramidal body with a square base, which carries the contact portion 400 on the top of the pyramid and has ears F on one side for connecting the end of the rod 3.

In the case of the examples of FIGS. 4 and 5, a contact portion 400 may be provided on any of the vertices (e.g., at the intersection of respective faces) or faces of the three-dimensional body.

In the examples of the figures, the markers M are carried by metal plates P, which magnetically adhere to magnets 41 arranged in corresponding seats of the faces 40 of the three-dimensional body.

Preferably, the markers M or QR codes each include information about an identifying element of the marker or the QR code, in such a way as to enable identification of the center of the marker allowing a controller to calculate the position of the contact portion 400 of the pointer element 4 based on the position of the marker, which is read by the vision system. In an example where two markers M are used on a face of the body (e.g., FIGS. 5 and 6), the two markers M can alternately be read by the vision system 5 and alternate contact portions 400 on the body of the pointer element 4 can be calculated and identified.

Being able to associate different identifiers with the markers M according to the type of body used to carry the markers allows recalculation of the point to be taught to the robot through the use of different roto-translation matrices that allow translation of the coordinate of the center of the marker into the coordinate of the contact portion 400.

In the example, the vision system is a 2D camera 50 preferably equipped with an infrared illuminator.

During the teaching step, the operator must place a predetermined marker M in favor of the camera by holding the telescopic rod 3 in his hand, while enabling the movement of the robot by holding down the dead man button 8 and while giving commands to the system via the buttons 9A, 9B.

If required, the control buttons 8, 9A, 9B may be carried by a hand-piece separate from the handle 6A of the rod, and gripped by the operator with the hand not holding the rod 3.

The configuration with multiple faces of the body of the pointer element 4 allows a marker M to always be visible by the 2D camera 50, whatever the configuration of the working area.

Preferably, the controller of the apparatus is configured to activate, at the request of the operator, a tracking mode of a marker M carried by the pointer element 4, wherein the 2D camera continuously detects, with a predetermined cadence (for example 5 Hz), the position of the marker M and communicates it to the controller, which consequently commands the robot to keep the relative position of the 2D camera unchanged with respect to the marker M.

Always preferably, during the teaching step, upon pressing the button 9A to learn the position of the marker by the robot, an additional check is carried out (e.g., made), by means of the robot controller, on the real reachability of the selected point by the processing tool (for example, the welding torch) carried by the robot. In this way it is sure to complete the learning step only for the points that are reachable during the process.

Of course, without prejudice to the principle of the invention, the details of construction and the embodiments may vary widely with respect to those described and illustrated, without departing from the scope of the present invention.

The invention claimed is:

1. A processing apparatus comprising an industrial robotic unit and a marking device configured to generate process trajectories that are automatically recognizable by the industrial robotic unit, wherein, said industrial robotic unit comprises a multi-axis manipulator robot including processing means arranged to perform a plurality of processing or assembly operations, said marking device is configured to be used manually by an operator to indicate the process trajectories automatically recognizable by the multi-axis manipulator robot, wherein the marking device is rod-shaped and further comprises at least one pointer element optically detectable by the multi-axis manipulator robot by a vision system, wherein the pointer element comprises:

a three-dimensional solid-shaped body further comprising a plurality of faces and a plurality of vertices defined by respective intersection of the faces;

a contact portion located at any of the plurality of faces or the plurality of vertices of the body of the pointer element, the contact portion configured to be brought into contact with a point of a working area, wherein the multi-axis manipulator robot is configured to learn a position of said point of said working area; and at least one of the plurality of faces is configured to carry at least one of a two-dimensional marker, or a QR code, each of which includes a center and is readable by the vision system, wherein the two-dimensional marker and the QR code each further comprise information about an identifying element of the respective two-dimensional marker or the QR code, in such a way as to allow a controller to calculate a position of the contact portion of the pointer element based on a position of the respective two-dimensional marker or the QR code which is read by the vision system, wherein a predetermined of the at least one of the two-dimensional marker or the QR code is selectively connected to a predetermined face of the plurality of faces of the pointer element that is associated with the selectively connected two-dimensional marker or the QR code, wherein the identifying element of the two-dimensional marker or the QR code selectively connected is configured to enable identification of the center of the two-dimensional marker or the QR code allowing the controller to translate a coordinate of the center into a coordinate of the contact portion.

2. The processing apparatus according to claim 1, wherein the multi-axis manipulator robot is configured to automatically position the processing means at a point indicated by the pointer element, following detection of a position of the pointer element by the vision system.

3. The processing apparatus according to claim 1, wherein said vision system is mounted on-board the multi-axis manipulator robot.

4. The processing apparatus according to claim 1, wherein the pointer element is arranged at a tip of the marking device, the pointer element and the marking device configured to indicate welding points carried out manually by the operator.

5. The processing apparatus according to claim 1, wherein said vision system comprises a 2D camera.

6. The processing apparatus according to claim 5, wherein the controller is configured to activate, at a request of the operator, a tracking mode of the two-dimensional marker carried by the pointer element, wherein the 2D camera continuously detects, with a predetermined cadence, the position of the two-dimensional marker and communicates it to the controller, which consequently commands the robot to keep the position of the 2D camera unchanged relative to the two-dimensional marker.

7. The processing apparatus according to claim 1, wherein the pointer element comprises a three-dimensional element of a predetermined geometry known by the vision system, following a preliminary programming step of the apparatus.

8. The processing apparatus according to claim 1, wherein the marking device further comprises a selection button arranged to exchange messages with the vision system for at least one of activating activities or interrupting activities, wherein the activating activities comprise activating a search function of the pointer element and identifying a specific position indicated as an obstacle to be circumvented that is along the process trajectory.

9. The processing apparatus according to claim 1, wherein the processing means comprise a welding torch arranged to perform an arc welding with metal under gas protection (MIG/MAG).

10. The processing apparatus according to claim 1, further comprising at least one of a portable control or a portable programming terminal usable by the operator, configured to provide a respective command signal to a controller of the processing apparatus in order to complete information to be sent to the robot, to carry out processing following the indication of the process trajectory traced by the marking device and detection by the vision system.

11. The processing apparatus according to claim 1, further comprising a preliminary auto-calibration configured to accurately identify a position and a distance of the pointer element with respect to the vision system.

12. A method for generating a process trajectory automatically recognizable by an industrial robotic unit, comprising:
providing a processing apparatus according to claim 1;
initiating a recording step for recording a position of the pointer element,
indicating by the pointer element a first point wherein to perform a processing by said processing means;
detecting a position of said first point by the vision system; and
entering additional parameters identifying a type of processing, using a human-machine interface (HMI) device.

13. The method according to claim 12, comprising:
indicating a process trajectory by moving the pointer element from the first point to an end point; and
detecting the process trajectory using the vision system.

14. The method according to claim 12, comprising:
instructing the processing apparatus about the type of processing and commanding the vision system to perform a laser scan to identify characteristics of components to be operated on; and
performing the processing from the first point to an end point.

15. The method according to claim 12, comprising the step of performing, by the vision system, an automatic quality control of the process carried out, by optically detecting points where the processing has been completed.

16. The method according to claim 12, wherein:
the pointer element comprises:
a three-dimensional solid-shaped body comprising a plurality of faces;
a contact portion configured to be brought into contact with a point of a working area, wherein the multi-axis manipulator robot is configured to learn a position of said point of said working area;
at least one of the plurality of faces is configured to carry at least one of a two-dimensional marker, or a QR code, each of which is readable by the vision system,
wherein the two-dimensional marker or the QR code further comprise information about an identifying element of the respective two-dimensional marker or the QR code, in such a way as to allow a controller to calculate a position of the contact portion of the pointer element based on a position of the respective two-dimensional marker or the QR code which is read by the vision system; and
said vision system comprises a 2D camera;
said method further comprising activating, at a request of the operator, through the controller of said processing apparatus, a tracking mode of the two-dimensional marker carried by the pointer element, wherein the 2D camera continuously detects, with a predetermined cadence, the position of the two-dimensional marker or the QR code and communicates it to the controller, which consequently commands the robot to keep the position of the 2D camera unchanged relative to a two-dimensional marker or the QR code.

17. The method according to claim 16, wherein during a learning step by the multi-axis manipulator robot of a position of points selected by the operator through said marking device, upon pressing a button for learning of the position of the two-dimensional marker or the QR code by the multi-axis manipulator robot, a further check is made, by the controller, on a reachability of the selected points by a processing tool carried by the robot.

18. The method according to claim 14, wherein the characteristics of the components to be operated on comprise a thickness of a metal sheet element.

19. The processing apparatus according to claim 1, wherein the pointer element comprises a magnet having a predetermined position relative to the contact portion on the predetermined face of the pointer element; and
each of the at least one of two-dimensional marker or the QR code comprises a metal plate, wherein the predetermined at least one of the two-dimensional marker or the QR code is selectively connected to the magnet.

20. The processing apparatus of claim 1, wherein the at least one two-dimensional marker or QR code comprises two of the two-dimensional marker or QR code positioned on the predetermined face of the plurality of faces of the body and positioned apart from one another, each of the two two-dimensional markers or the QR codes including information about the identifying element that is different from one another allowing the controller to calculate the respective coordinate of two alternate contact portions on the body based on the information of the identifying element of the two-dimensional marker or QR that is alternately read by the vision system.

* * * * *